United States Patent

[11] 3,560,644

[72] Inventors Edward A. Petrocelli;
Robert G. Palmer, Orlando, Fla.

[21] Appl. No. 709,385
[22] Filed Feb. 29, 1968
[45] Patented Feb. 2, 1971
[73] Assignee the United States of America as represented by the Secretary of the Navy

[54] MULTIPLE PROJECTION TELEVISION SYSTEM
2 Claims, 4 Drawing Figs.

[52] U.S. Cl. .......... 178/6.8, 35/11, 35/25
[51] Int. Cl. .......... H04n 3/00, H04n 5/74
[50] Field of Search .......... 178/6TM, 6F&M, 6.8; 35/11, 12, 25

[56] References Cited

UNITED STATES PATENTS

| | | | |
|---|---|---|---|
| 2,219,149 | 10/1940 | Goldsmith | 178/6.8 |
| 2,492,969 | 1/1950 | Crane | 35/12X |
| 2,883,763 | 4/1959 | Schaper | 35/12 |
| 3,012,337 | 12/1961 | Spencer, Jr. et al. | 35/12 |
| 3,291,905 | 12/1966 | Smith | 178/6.8 |

FOREIGN PATENTS

| | | | |
|---|---|---|---|
| 467,195 | 6/1937 | England | 178/7.85 |

*Primary Examiner*—Robert L. Griffin
*Assistant Examiner*—Richard K. Eckert, Jr.
*Attorneys*—R.I. Tompkins, J. W. Pease and J. F. Miller

ABSTRACT: In prior art simulators used in training devices, a plurality of TV cameras survey a seascape and a plurality of ship models respectively to furnish video information which is combined into a picture of ships maneuvering on a seascape background and displayed on a CR tube monitor or a screen. The invention enhances the realism of such simulators by using a plurality of TV projectors each projecting a picture on a respective sector of a circular screen. Circuitry is provided for synchronizing the projectors with the cameras so that a ship may be caused to move across a screen which may completely surround a control station occupied by a trainee to give him the impression of being at sea. The circuitry enables any projector to project video information from any or all cameras, in contradistinction to prior art systems wherein each projector receives information from an associated camera only.

PATENTED FEB 2 1971

3,560,644

Edward A. Petrocelli
Robert G. Palmer
INVENTORS
BY John F. Miller
Agent
John M. Pease
Attorney Edward A. Petrocelli
Robert G. Palmer
INVENTORS BY John F. Miller
Agent
John M. [signature]
Attorney Edward A. Petrocelli
Robert G. Palmer
INVENTORS
BY John F. Miller
John W. [illegible] Agent
Attorney

MULTIPLE PROJECTION TELEVISION SYSTEM

BACKGROUND OF THE INVENTION

The invention is in the field of simulators such as those used in naval training devices to synthesize on a display device a picture of ships maneuvering at sea before a mockup of a submarine or ship control station. In such devices a trainee at the control station learns to manipulate controls to operate and maneuver his own ship with reference to the positions of the simulated ships. In the prior art the display device usually consists of a cathode ray tube monitor or a screen on which a TV projector generates a picture. Thus the trainee's view of the environment in the prior art simulators is limited. The present invention uses a plurality of synchronized TV projectors and a circular screen which may extend over 360° of azimuth to overcome this limitation.

SUMMARY OF THE INVENTION

A synchronizing and projection system used with prior art training device simulators to combine the video information from several TV cameras into a composite picture of ships maneuvering on a seascape background. The video information is applied to several projectors which are actuated sequentially. Each projector is trained on a respective sector of a circular screen. The cameras may be operated at selected times so that the video information from a particular camera is reproduced by a particular projector or projectors. By this means a seascape background scene may be synthesized on a circular screen extending over up to 360° of azimuth around a control station. Ships may be made to traverse the entire screen.

DESCRIPTION OF THE PREFERRED EMBODIMENT

Figure 1:
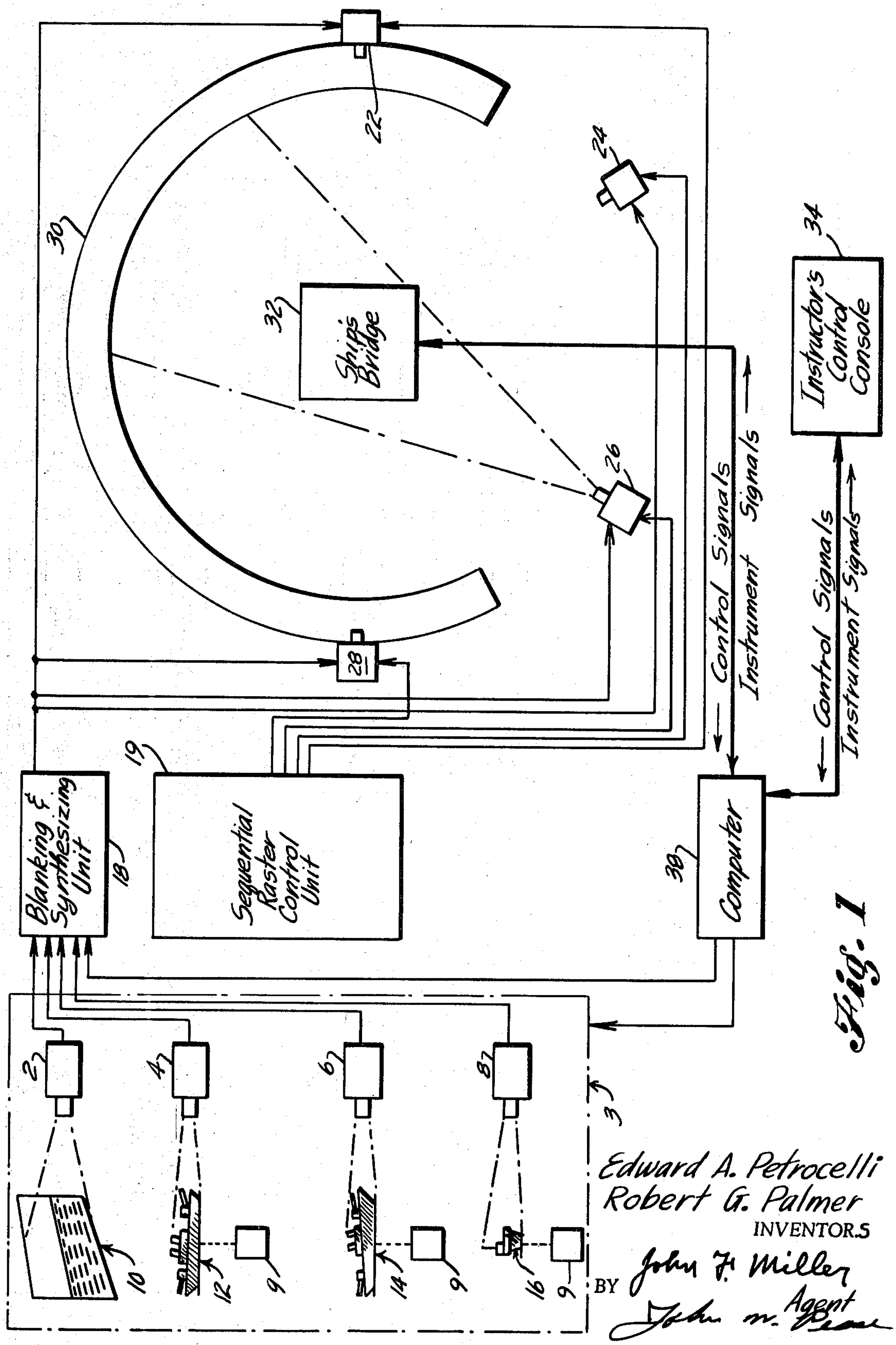
FIG. 1 shows the several elements of the invention and their functional interrelationships.

The general arrangement of the invention is shown in FIG. 1. Here the invention is shown with simulator apparatus such as is used in some naval training devices and taught in U.S. application for Pat. No. 612,770, filed 27 Jan. 1967, by Hanns H. Wolff now U.S. Pat. No. 3,507,990. A camera scanning system 3 comprising several TV cameras such as cameras 2, 4, 6, and 8 and ship models such as 12, 14, and 16, is so arranged that each camera scans a respective ship model, or, in the case of camera 2, a replica 10 of a seascape showing sea and sky. The video outputs of the several cameras are connected by the leads shown through a blanking and synthesizing unit 18 to TV projectors 22, 24, 26, and 28. The video information from the cameras is projected as a single composite picture of seascape and ship models on a screen 30. The purpose of the blanking and synthesizing unit 18 is to combine the video information so that it appears on screen 30 with ship models showing against a seascape background and with any part of a distant ship model which is obscured from view by a nearer ship, blanked out of the picture. A mockup of a ships bridge 32 may be positioned inside screen 30 and an instructor's instrument and control console 34 may be conveniently positioned nearby. Ships bridge 32 and instructor's console 34 may be equipped with controls and instruments to transmit control information to a computer 38 and receive information therefrom. Such information may consist of ship position, heading, course, speed, etc. U.S. application for Pat. No. 643,306, filed 29 May 1967, by Moses Aronson, teaches a simulated ships bridge suitable for use with applicant's apparatus. Camera scanning system 3 is controlled by computer 38 as indicated by the connecting cable shown. Camera scanning system 3 contains connecting means for transmitting information to and from computer 38 to cameras 2, 4, 6, 8, and to servosystems 9 which rotate the ship models when a change of heading is ordered by the computer. These connecting means are not shown since these are details unrelated to the present invention.

The arrangement is such that an instructor at console 34 may control computer 38 from console 34 so that signals from computer 38 control the cameras and servos of camera scanning system 3. The cameras are controlled to effect changes in range and position of the ships displayed on screen 30. The computer converts the control information in such manner than the ships move across the seascape. The speed, heading, range, position, etc., of the ships changes in accordance with the instructors control signals. In a like manner control signals from a trainee on simulated ships bridge 32 may cause computer 38 to effect changes in heading, speed, etc., of own ship relative to ships 12, 14, and 16 as seen on screen 30. Thus, a trainee may obtain invaluable experience in controlling and maneuvering a ship without actually going to sea. The instructor may control the operation to create various problems which the student attempts to solve.

This general arrangement of a camera scanning system and an instructors control station with the video information from several cameras being combined into a single composite picture, is taught in the above mentioned Wolff application, In the Wolff application the composite picture is formed on a cathode ray tube screen.

Figure 3:
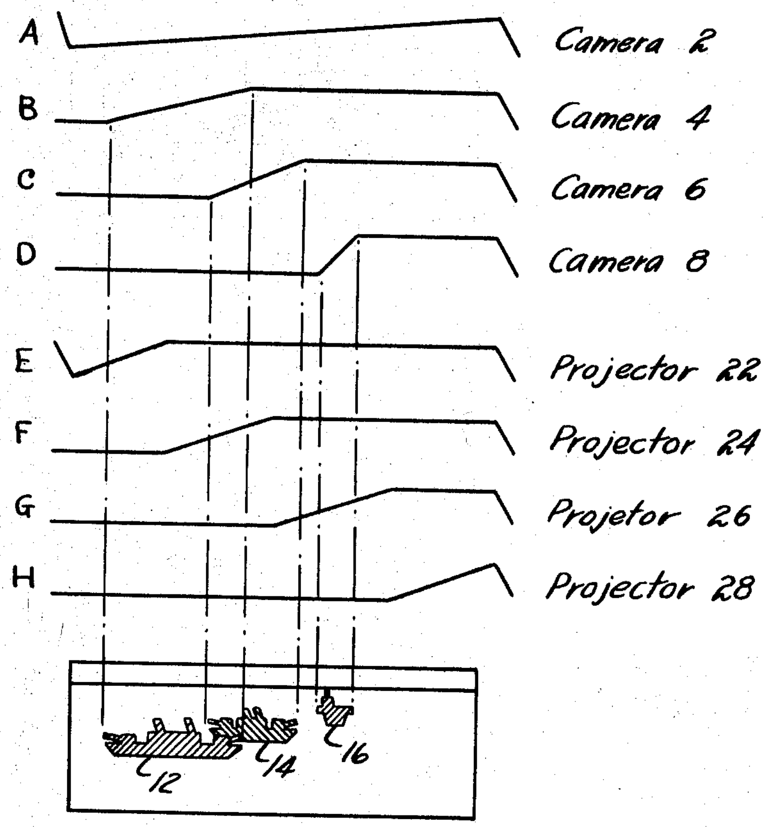
FIG. 3 shows some waveforms of the sweep circuit voltages developed in the projectors and cameras.

Applicant's invention is embodied in the arrangement of a sequential raster control unit 19 and the multiplicity of TV projectors arranged to project on a circular screen. This enables the projection of the video information from camera scanning system 3 on all of circular screen 30 rather than on a single TV monitor as taught in the Wolff application. A trainee on bridge 32 is practically surrounded by the seascape and the maneuvering ships shown on screen 30. This increases the realism of the training to the extent that the effectiveness of the simulation is greatly enhanced. Sequential raster control unit 19 contains timing circuits which cause the sweep voltage generating circuits for projectors 22, 24, 26, and 28, to generate sweep voltages sequentially, in order, and in synchronization with the camera sweep voltages. Thus, projector 22 will scan a first sector of screen 30, then projector 24 will scan the adjacent sector, followed by projectors 26, 28, 22, 24, etc. The projector sweep voltages are shown in FIG. 3. Here graph E represents the waveshape of the horizontal sweep circuit voltage for projector 22, the graph F, the waveshape of the horizontal sweep circuit voltage for projector 24, and the graphs G and H the waveshapes of the horizontal sweep circuit voltages of projectors 26 and 28 respectively. Graph A shows the horizontal sweep voltage of camera 2 which observes the seascape 10. The ramp section of this voltage which represents the time in which the electron beam of a camera traverses the image has a duration equal to the combined durations of the ramp portions of the horizontal sweep voltages of the four projectors. The video information from all of the cameras is applied to all of the projectors through the blanking and synthesizing circuit 18 continuously. Therefore a seascape will be projected on every sector of screen 30 by the four projectors. Graph B represents a horizontal sweep voltage for camera 4. Note that the ramp portion of voltage B overlaps or is coincident in time with part of the ramp of the horizontal sweep voltage for projector 22 (graph E) and part of the ramp of the horizontal sweep voltage for projector 24 (graph F). Therefore, part of ship model 12 will be shown on the projector 22 portion of screen 30 and part will be shown on the projector 24 sector of screen 30. This is illustrated by the flattened view of screen 30 at the bottom of FIG. 3. The ramp portion of the horizontal sweep voltage for camera 6 as shown in graph C is positioned in time so that part of ship 14 will be in the projector 24 sector and part will be in the projector 26 sector of screen 30. All of ship 16 as illustrated by graph D will be shown in the projector 26 sector of screen 30. Since the ramp portion of any camera sweep voltage may be delayed so as to be coincident in time with the ramps of any one or more of the projector sweep voltages, a particular ship may be shown on any part of screen 30. The slope of the ramp sections of the camera sweep voltages may be altered to change to the apparent range of a ship as illustrated by graphs B, C, and D. When a circular screen such as 30 is used, a trainee in the center at ships bridge 32 gets a realistic impression of being at sea.

Figure 2:
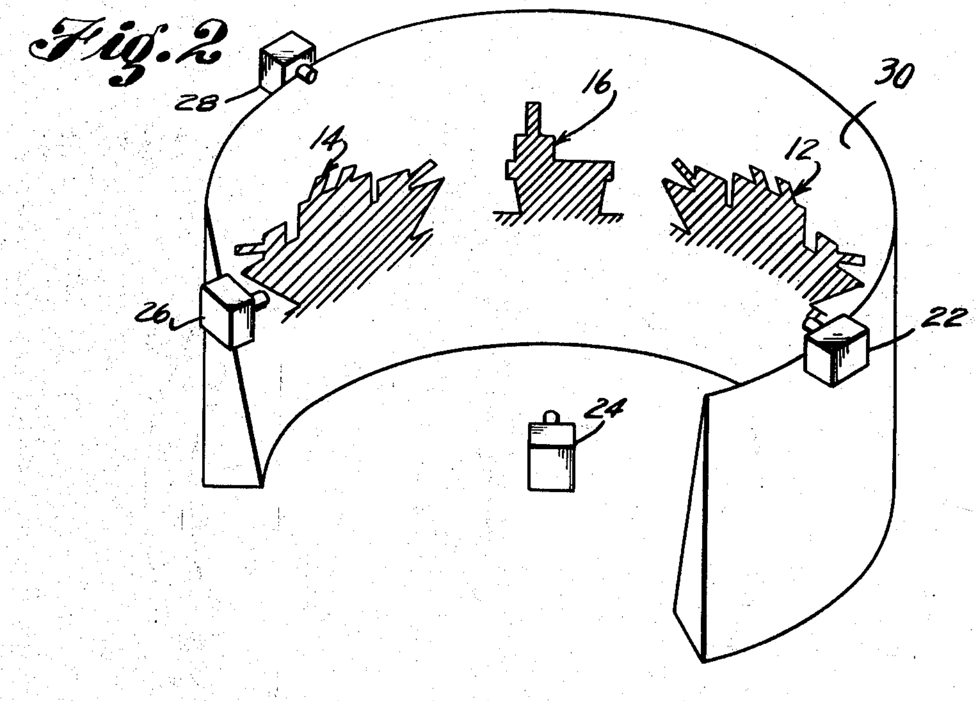
FIG. 2 is view of a screen and associated projectors.
Figure 4:
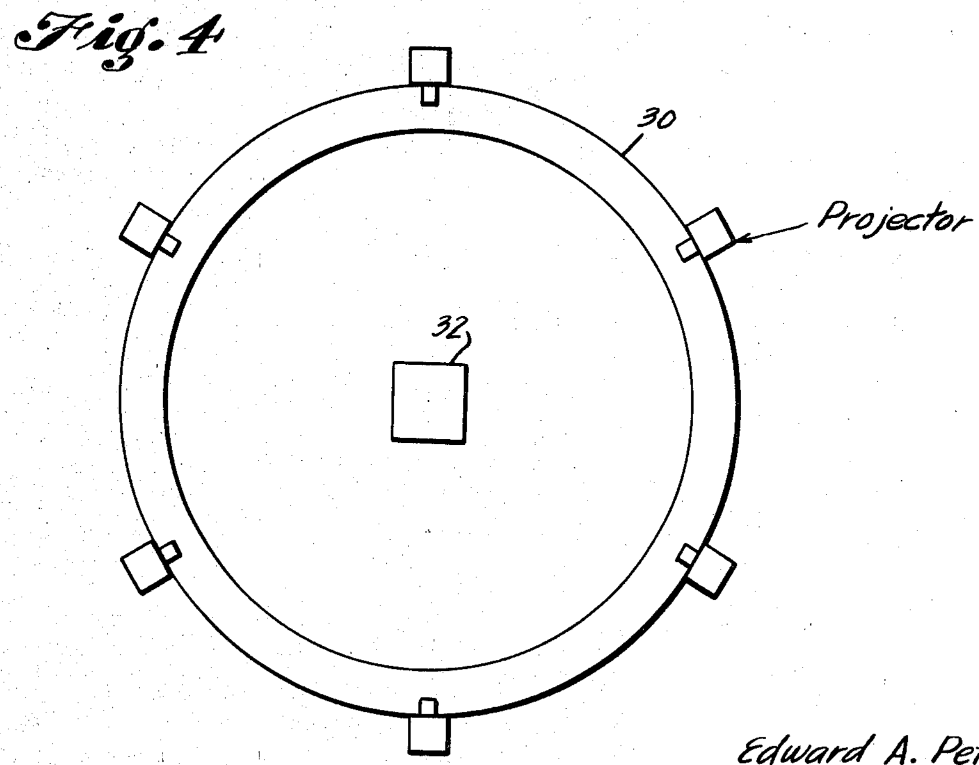
FIG. 4 shows a circular screen extending over 360° of azimuth.

Applicant's invention is not limited to the 240° screen shown by way of example. Obviously the screen 30 as illustrated in FIGS. 1 and 2 could be extended to a full 360° and additional TV projectors used. Such an arrangement is shown in FIG. 4 where six projectors are trained on a 360° screen 30.

It should be understood that the various elements shown in FIG. 1 are synchronized in a well-known manner by pulses from a common oscillator.

Many possible modifications of the invention will be apparent to those skilled in the art. For example, various effects could also be secured such as multiple images of a single ship by altering the timing and/or frequency of the various camera and projector sweep circuit voltages. It should therefore be understood that the invention is not confined to the embodiment disclosed by way of example, but is limited only by the following claims.

The invention described herein may be manufactured and used by or for the Government of the United States of America for governmental purposes without the payment of any royalties thereon or therefor.

I claim:

1. In a simulator type training device having a background camera and a plurality of model ship cameras with means for combining the video information from said cameras into a single picture of model ships maneuvering against a background displayed on a display tube:

means for varying the timing and the rate of the sweep voltages of said cameras to change the size and position of the images of said ships on said background;

a circular screen, a simulated ship's bridge encompassed by said screen, a plurality of TV projectors positioned to project on respective sectors of said screen, a sweep voltage generating circuit for each of said projectors;

sequential raster control means for synchronizing the sweep voltage generating circuits of said TV projectors with the sweep voltage generating circuits of said TV cameras;

said sequential raster control means including means for causing said projectors to project video information from said cameras in sequence upon adjacent sectors of said screen; and said sequential control means including means whereby the timing and duration of the sweep voltages of said projectors may be selectively altered whereby the image of any ship may be made to cover the entire area of said screen or any part thereof and to traverse any part thereof.

2. The apparatus of claim 1, wherein said circular screen subtends an angle of 360° and said sequential raster control means includes projector sequencing means whereby a ship model viewed by one of said cameras is caused to traverse all of said screen to simulate 360° of travel around said simulated ships bridge.